United States Patent
Engler et al.

(10) Patent No.: US 6,521,145 B1
(45) Date of Patent: Feb. 18, 2003

(54) REFLECTIVE PARTICLE DISPLAY FILM AND METHOD OF MANUFACTURE

(75) Inventors: David A. Engler, St. Paul, MN (US); Brit G. Billingsley, St. Paul, MN (US); William D. Miller, St. Paul, MN (US); Richard John Pokorny, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 210 days.

(21) Appl. No.: 09/676,615

(22) Filed: Oct. 2, 2000

Related U.S. Application Data

(60) Division of application No. 09/240,100, filed on Jan. 29, 1999, now Pat. No. 6,383,619, which is a continuation-in-part of application No. 09/016,348, filed on Jan. 30, 1998, now abandoned.

(51) Int. Cl.$^7$ .............................................. B29D 11/00
(52) U.S. Cl. ......................................... 264/1.9; 264/2.7
(58) Field of Search ........................ 264/1.1, 1.7, 1.9, 264/2.7, 152, 157

(56) References Cited

U.S. PATENT DOCUMENTS

| | | |
|---|---|---|
| 4,102,562 A | 7/1978 | Harper et al. |
| 4,126,854 A | 11/1978 | Sheridon |

(List continued on next page.)

FOREIGN PATENT DOCUMENTS

| | | |
|---|---|---|
| DE | 19500465 | 7/1996 |
| EP | 540281 | 5/1993 |
| EP | 721176 | 7/1996 |
| EP | 721177 | 7/1996 |
| EP | 783163 | 7/1997 |
| JP | 8336637 | 12/1996 |
| WO | WO 97/33267 | 9/1997 |
| WO | WO 97/50071 | 12/1997 |
| WO | WO 97/50072 | 12/1997 |

OTHER PUBLICATIONS

Comiskey B. et al., "Late—News Paper: Electrophoretic Ink: A Printable Display Material", *SID 97 Digest*, pp. 75–76 (1997).

Dalisa, A., "Electrophoretic Display Technology", *IEEE Transactions on Electron Devices*, vol. Ed. 24, No. 7, pp. 827–834 (Jul. 1977).

Jones, T., "Particle Rotation", *Electromechanics of Particles*, pp. xvii–xxii, 83–109 (1995).

Micheletto, R. et al., "Simple Method for the Production of a Two–Dimensional, Ordered Array of Small Latex Particles", *Langmuir*, vol. 11, No. 9, pp. 3333–3336 (Sep. 1995).

Platt, C. "Printed Paper is Cheap, Cheerful, and Ubiquitous. It's The Bedrock Of A Billion–Dollar Global Industry. And If MIT's Joe Jacobson Can Work Out A Few Little Details, It's Over", *Wired*, Issue 5.05, Digital Ink, pp. 1–6 (May 1997).

Sheridon, N.K. et al., "The Gyricon Rotating Ball Display", *Xero Palo Alto Research Center*, pp. 1–2 (Jun. 27, 1997).

Slide presentation, "Introduction to E Ink Corporation", pp. 1–7 (May 1997).

*Primary Examiner*—Mathieu D. Vargot
(74) *Attorney, Agent, or Firm*—Stephen W. Buckingham

(57) ABSTRACT

Generally, the present invention relates to a display film and a method of making same, where the display uses electrically responsive, reflective particles disposed within a polymer matrix. The invention includes a method of making a display film having one or more monolayers of the reflective particles. The invention is also directed to a display having particles selected from a production distribution of particles.

5 Claims, 13 Drawing Sheets

U.S. PATENT DOCUMENTS

| | | |
|---|---|---|
| 4,143,103 A | 3/1979 | Sheridon |
| 4,438,160 A | 3/1984 | Ishikawa et al. |
| 4,763,985 A | 8/1988 | Bingham |
| 4,919,521 A | 4/1990 | Tada et al. |
| 5,262,098 A | 11/1993 | Crowley et al. |
| 5,474,827 A | 12/1995 | Crandall et al. |
| 5,604,027 A | 2/1997 | Sheridon |
| 5,708,525 A | 1/1998 | Sheridon |
| 5,717,514 A | 2/1998 | Sheridon |
| 5,717,515 A | 2/1998 | Sheridon |
| 5,723,204 A | 3/1998 | Stefik |
| 5,739,801 A | 4/1998 | Sheridon |
| 5,754,332 A | 5/1998 | Crowley |
| 5,760,761 A | 6/1998 | Sheridon |
| 5,777,782 A | 7/1998 | Sheridon |
| 5,808,783 A | 9/1998 | Crowley |
| 5,812,316 A | 9/1998 | Ochi et al. |
| 5,815,306 A | 9/1998 | Sheridon et al. |
| 5,894,367 A | 4/1999 | Sheridon |
| 5,900,192 A | 5/1999 | Richley |
| 5,900,858 A | 5/1999 | Richley |
| 5,904,790 A | 5/1999 | Sheridon |
| 6,059,915 A | 5/2000 | Lightle et al. |
| 6,162,321 A | 12/2000 | Silverman |

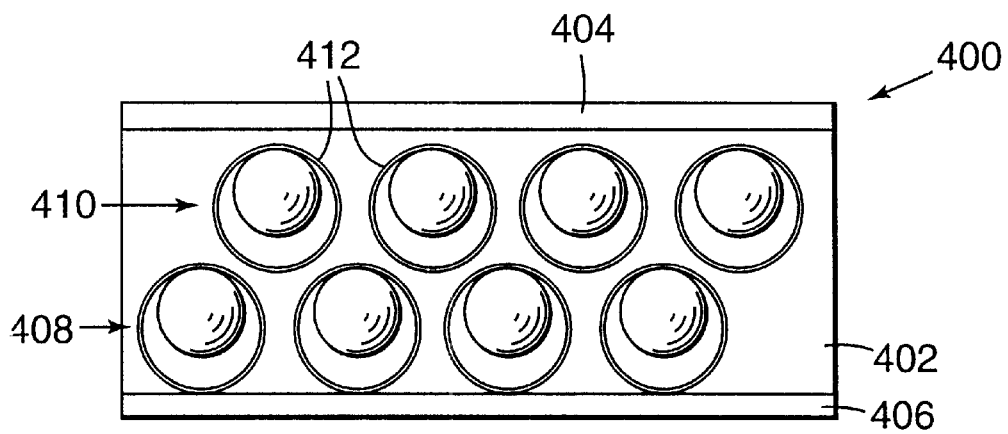
Fig. 4A
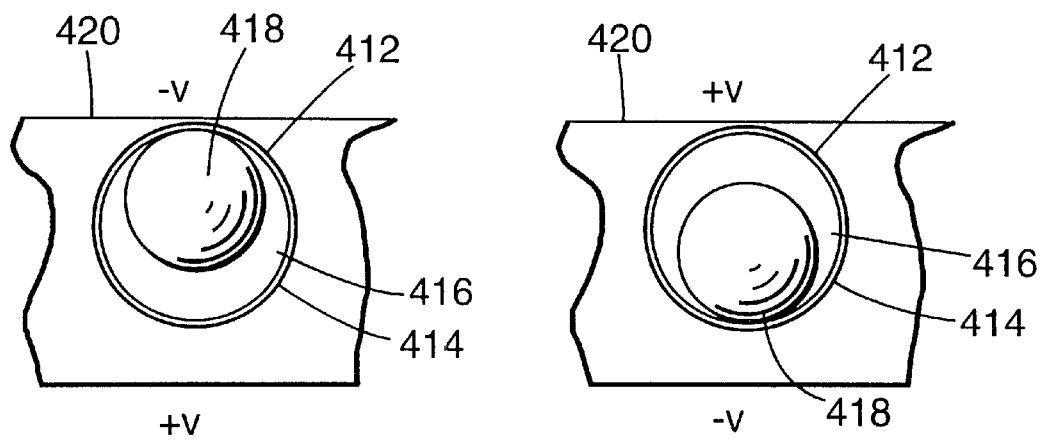
Fig. 4B  Fig. 4C

REFLECTIVE PARTICLE DISPLAY FILM AND METHOD OF MANUFACTURE

This is a division of application Ser. No. 09/240,100, filed Jan. 29, 1999, now U.S. Pat. No. 6,383,619, which is a continuation-in-part application of U.S. patent application Ser. No. 09/016,348, filed on Jan. 30, 1998, now abandoned which is incorporated herein by reference.

BACKGROUND

The present invention is directed generally to an electrically addressable matrix display, and more specifically to a matrix display film incorporating electrically activatable, reflective particles and a method of manufacturing the film.

Some flat displays are based on the movement of electrically activatable particles under the influence of an applied electric field. In one approach to fabricating such a display, bichromal, electrically responsive particles twist under the application of an electric field to orient one or other color of the particle's surface in a viewing direction. The particular color that is oriented towards the viewing direction is dependent on the polarity of the applied electric field. Typically, the bichromal particles are spherical in shape and are suspended in a dielectric liquid.

A second approach includes the use of particles that translate within a surrounding fluid under the influence of an applied electric field. Typically, the particles and the fluid have contrasting colors, e.g., the fluid is a dark-colored dye and the particle is colored white. When a specific polarization of electric field is applied to the device, the particles move towards a viewing surface, displacing the chromatically contrasting fluid to become visible to the viewer.

The full potential of these approaches to fabricating a flat display has not yet been realized. The existing devices suffer from low contrast and low resolution. In addition, the devices produced to date are thick, thus requiring large operating voltages to produce a sufficiently large electric field across the electrically activatable particles for activation.

There is, therefore, a need to improve the contrast, resolution, and operating voltage of such devices.

SUMMARY OF THE INVENTION

Generally, the present invention relates to a display film and a method of making same. The invention is generally directed to a method of making a display film having one or more monolayers of electrically active particles. The invention is also directed to a display having particles selected from a production distribution of particles.

In one particular embodiment, the invention is a display film, having a polymer layer with first and second surfaces. First and second monolayers of reflective particles are disposed within the polymer layer, the reflective particles being movably responsive to an electric field applied through the polymer layer. The reflective particles in the first monolayer have a first distribution of diameters over a first diameter range, and the reflective particles in the second monolayer have a second distribution of diameters over a second diameter range different from the first diameter range. The first and second distributions of diameters form portions of a production diameter distribution.

In another embodiment of the invention, a method of making a display film includes applying a monolayer of reflective particles over a first polymer coating, covering the reflective particles with a second polymer film having an upper surface; and applying the upper surface of a first portion of the second polymer coating to the upper surface of a second portion of the second polymer coating.

In another embodiment of the invention, a method of making a display film includes applying a first monolayer of reflective particles over a first polymer coating, covering the first monolayer of reflective particles with a second polymer coating, applying a second monolayer of reflective particles over the second polymer coating, and overcoating the second monolayer of reflective particles with a third polymer coating.

In another embodiment of the invention, a method of making a display film includes pressing, towards each other, first and second liner sheets, having a first layer of polymer mixed with electrically responsive reflective particles therebetween, so that the first layer of polymer mixed with reflective particles has a first selected thickness.

Yet another embodiment of a method of forming a display film includes applying a first polymer layer containing a first monolayer of first bichromal, electrically responsive, reflective particles onto a first surface of a second polymer layer containing a second monolayer of second bichromal, electrically responsive, reflective particles.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 4A illustrates a cross-section through a reflective particle display film having two monolayers of microencapsulated electrophoretic particles according to an embodiment of the present invention;

FIGS. 4B and 4C illustrate the response of a microencapsulated electrophoretic particle under oppositely polarized electric fields;

Figure 1A:
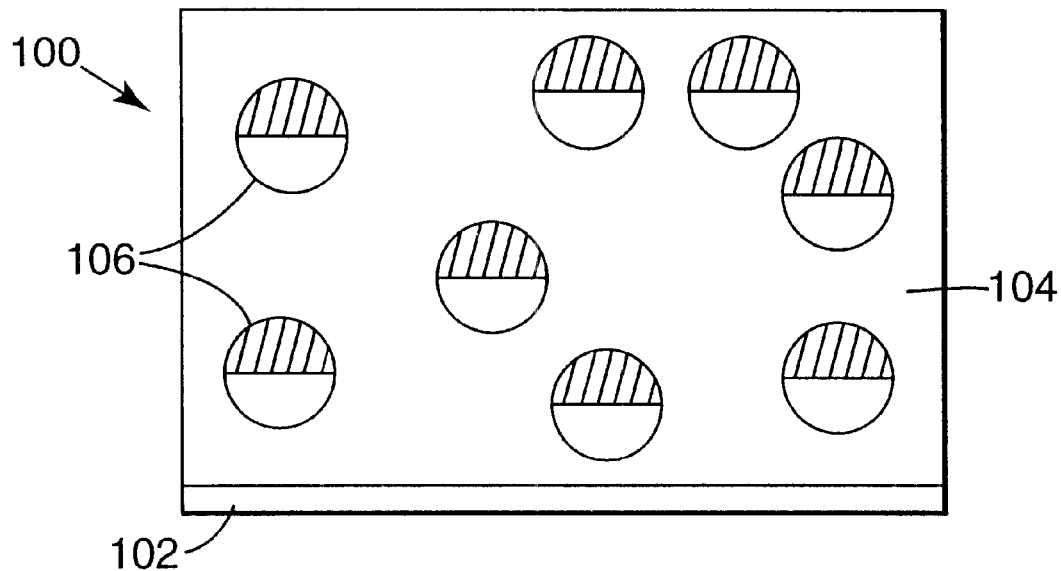
FIG. 1A illustrates a cross-section through a reflective particle display film having randomly disposed particles.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to a reflective particle display in which electrically activatable particles move under the application of an applied electric field so as to cause a chromatic change in the display. In particular, the present invention is applicable to reflective particle displays for applications requiring high contrast, high resolution, and low operating voltage, such as thin, portable electronic displays. The present invention may also be suited for use in "electronic paper".

In the following description, the electrically activatable reflective particles are particles that are electrically anisotropic. The application of a sufficiently strong electric field to a randomly oriented distribution of such particles commonly results in the particles moving, for example rotating or translating, into a position of lower electrical potential energy. The particles are termed reflective because the display effect is based on modulating the light reflected, typically diffusely reflected, from the particle as a result of the particle's movement in response to an applied electric field.

Figures 1B, 1C:
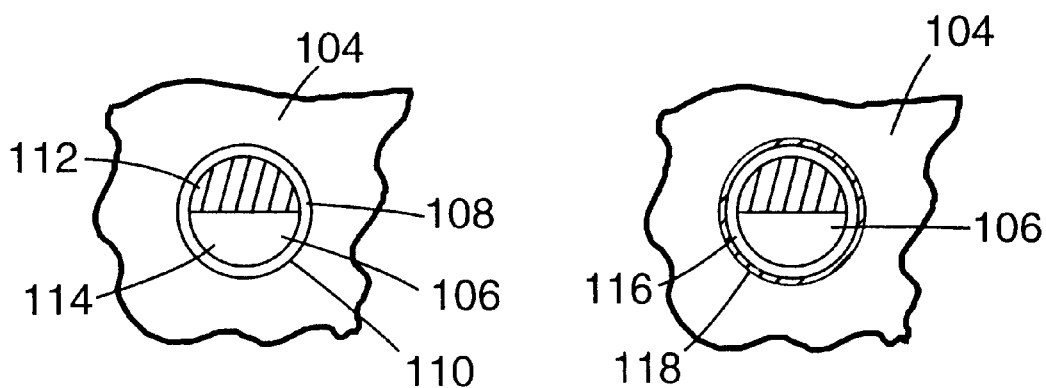
FIG. 1B illustrates a reflective particle in a liquid filled cavity in a film matrix.
FIG. 1C illustrates a microencapsulated reflective particle in a film matrix.

One approach to forming a reflective particle display is to mix electrically activatable particles in a matrix, to form a layer of the matrix and then cure or set the layer. This leads to a random distribution of the electrically activatable particles within the matrix. This is illustrated in FIG. 1A, where the film 100 includes a substrate layer 102, on top of which is positioned a polymer matrix layer 104. In the embodiment shown, bichromal, electrically activatable particles 106 are disposed randomly through the matrix layer 104. The particles 106 are illustrated to be rotationally aligned, as occurs under the application of an electric field across the matrix layer 104. The bichromal particles may be made free to rotate within the matrix layer 104 by absorbing a liquid into the matrix, for example absorbing a liquid agent, such as low viscosity silicone oil into a cured silicone polymer matrix, as discussed in U.S. Pat. No. 4,126,854, incorporated herein by reference. The polymer of the matrix layer 104 absorbs the liquid, swelling in the process. FIG. 1B illustrates detail around the bichromal particle 106 after absorption of the liquid. The liquid is absorbed only by the polymer of the matrix 104 and not by the bichromal particle 106. Consequently, the swelling of the matrix 104 forms a cavity 108 surrounding the bichromal particle 106. This cavity 108 is filled with the liquid 110. The liquid-filled cavity 108 permits rotation of the bichromal particle 106 under the application of an electric field. It will be appreciated that the matrix layer 104 is formed from a permeable material, such as silicone polymer, of which Dow Corning Sylgard 182 and 184 are examples, to receive the liquid 110.

The bichromal particles 106 typically have first hemispheres 112 formed of one color, e.g., black or a dark color, while the other hemisphere 114 is formed of an optically contrasting color, e.g., white or a light color. The bichromal particle 106 is also electrically anisotropic so that one hemisphere is more strongly attracted to, or more strongly repelled by, an electrical potential than the other hemisphere.

Another approach, illustrated in FIG. 1C, may be used to dispose the rotatable bichromal particle 106 within the matrix layer 104. In this approach, the bichromal particles 106 are suspended within a fluid 116 contained within an encapsulating shell 118, for example as described in U.S. Pat. No. 5,604,027, incorporated herein by reference. The bichromal particles 106 within the shells 118 are then dispersed within the matrix layer 104. An advantage of using microencapsulated particles is that the material used for the matrix layer 104 does not need to be permeable by a liquid, thus enabling a larger selection of materials to be used in the for the polymer matrix layer 104. The matrix layer 104 may in this case be made from clear polymers such as urethane, silicone, polyethylene, polypropylene, acrylic, polystyrene and epoxy. This list is not intended to be exhaustive, nor to limit the invention in any way, but merely to be illustrative. The cured polymer may be rigid or flexible.

There are problems associated with the structure illustrated in FIG. 1. Since there is a large separation between particles 106 within the matrix layer 104, the resolution and contrast of the film are well below optimum. Additionally, the film is required to be relatively thick in order for the particles to cover a high percentage of the viewing surface and, consequently, the operating voltage is high.

Figure 2A:
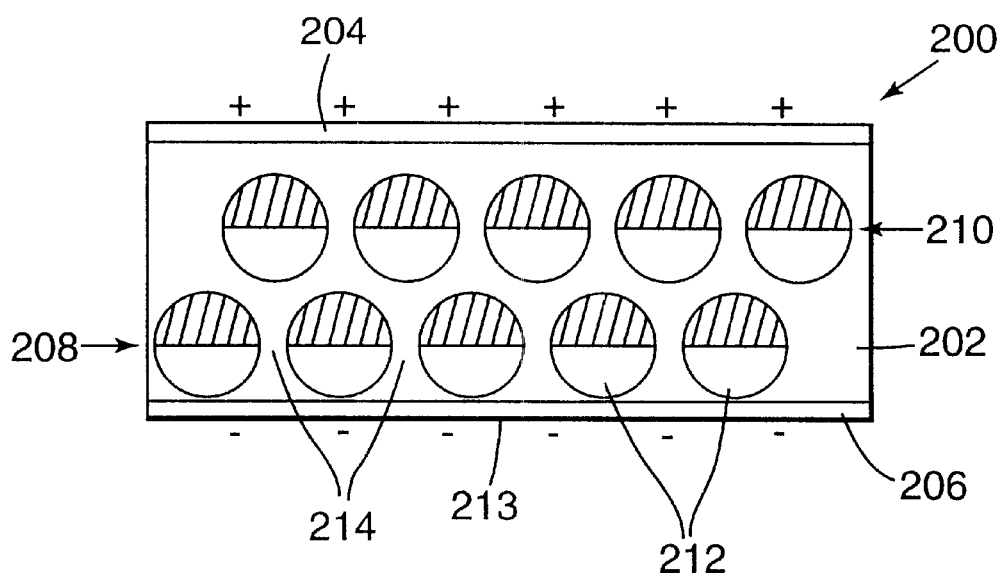
FIG. 2A illustrates a cross-section through a reflective particle display film having two monolayers of particles according to an embodiment of the present invention.

FIG. 2A illustrates an embodiment of a reflective particle display in which the resolution and contrast are enhanced, and the voltage required for activating the particles is reduced. This embodiment of film 200 includes a matrix layer 202 disposed between upper and lower electrode layers 204 and 206, respectively. As discussed earlier, the matrix layer 202 may be formed from a material permeable by a liquid to form the cavities, such as Dow Corning Sylgard 184. Where the particles are microencapsulated, the matrix layer 202 may also be formed from a nonpermeable polymer material including, but not limited to, polystyrene, polyurethane, polypropylene, acrylic, and epoxy.

The matrix layer 202 includes two monolayers 208 and 210 of electrically activatable particles 212. A monolayer is a layer of particles having a thickness of essentially one particle. The particles 212 and the first monolayer 208 may be arranged in a close-packed pattern, such as an hexagonal pattern, to reduce the distance between adjacent particles. The two-layer film 200 has a higher resolution and contrast over those achieved using a random distribution of particles.

The particles 212 in the second monolayer 210 may also be close-packed, for example, in an hexagonal pattern. An advantage provided by the second monolayer 210 may be understood by realizing that, even if the particles 212 in the first monolayer 208 are perfectly arranged in an hexagonal, close-packed pattern, a significant fraction of the viewing surface remains uncovered because of the interstitial gaps 214 between adjacent particles 212. Offsetting the particles 212 in the second monolayer 210 relative to those of the first layer 208 may result in aligning the particles 212 of the second layer 210 with the interstitial gaps 214, thus permitting the fraction of the viewing area filled with particles 212 to be even greater than that produced by single layer having perfect hexagonal packing. Judicious placement of the particles 212 of the second monolayer 210, allows up to approximately 100% of the viewing area to be filled. Thus, viewing area fill factor, contrast, and resolution may all increase with respect to a film with randomly placed particles, as a result of using two monolayers of particles. In addition, the film thickness may be reduced, permitting lower operating voltages.

The use of two or more monolayers of particles may provide a higher fill factor than is possible with a film having only a single monolayer, and may also produce higher contrast and resolution than are provided by a single monolayer film.

Where the packing of the particles 212 is less than optimum, two monolayers of particles 212 may fill up to approximately 100% of the viewing area, for example where each monolayer fills approximately 50% of the viewing area.

Electrodes may be included the upper and lower layers 204 and 206 respectively. An electric field applied across the electrodes, illustrated as positive and negative charges on the upper and lower layers 204 and 206, may orient the particles 212 in alignment.

The matrix layer 202 may be formed of a material that is clear, transparent or colored. The matrix layer 202 may also be formed of a material that is semi-opaque, and the particles are positioned sufficiently close to the viewing surface 213 as to be viewable through the matrix layer 202.

Figure 2B:
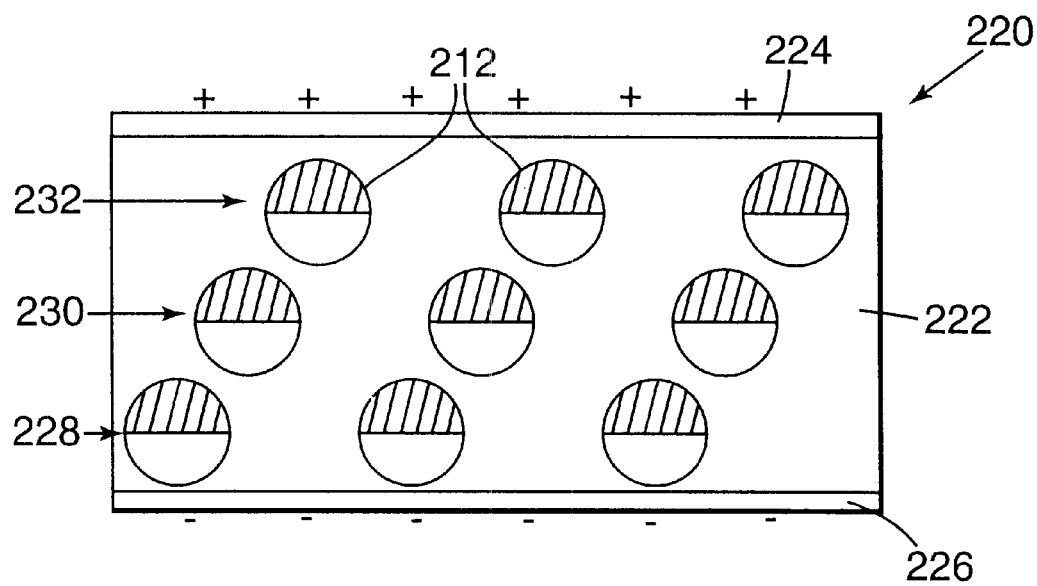
FIG. 2B illustrates a cross-section through a reflective particle display film having three monolayers of particles according to an embodiment of the present invention.

More than two monolayers of particles may also be used in the matrix 202, which may provide an advantage of increasing the fill factor where the particles in the monolayers are not 100% hexagonally close-packed. For example, FIG. 2B illustrates a film 220 that incorporates three monolayers of particles 222, 224, and 226. These monolayers 222, 224, and 226 are typically packed at less than the maximum packing density. Additional monolayers may be further added to increase the fill factor, the contrast, and the resolution where the packing is less than 100% close-packed. This multiple-monolayer film 200 may require a lower operating voltage than a film with randomly distributed particles.

Electrodes may be included with the upper and lower layers 224 and 226 respectively. An electric field applied across the electrodes, illustrated as positive and negative charges on the upper and lower layers 224 and 226, may orient the particles 212 in alignment.

U.S. Pat. Nos. 5,754,332 and 5,808,783, incorporated herein by reference, discuss the compromises that occur when selecting one or two monolayers. On one hand, a single monolayer gives a thin, high resolution display film, but maximum close packing is difficult to achieve, and so contrast of the display film may be reduced. Therefore, a second monolayer, having particles smaller than those in the first monolayer, may be used. U.S. Pat. Nos. 5,754,332 and 5,808,783 discuss various considerations for producing a display film having one or more monolayers of particles. It is advantageous that the second monolayer of particles to be formed from particles having a smaller diameter than the first monolayer, and that the second monolayer be formed between the first monolayer and the viewing surface.

Figure 3A:
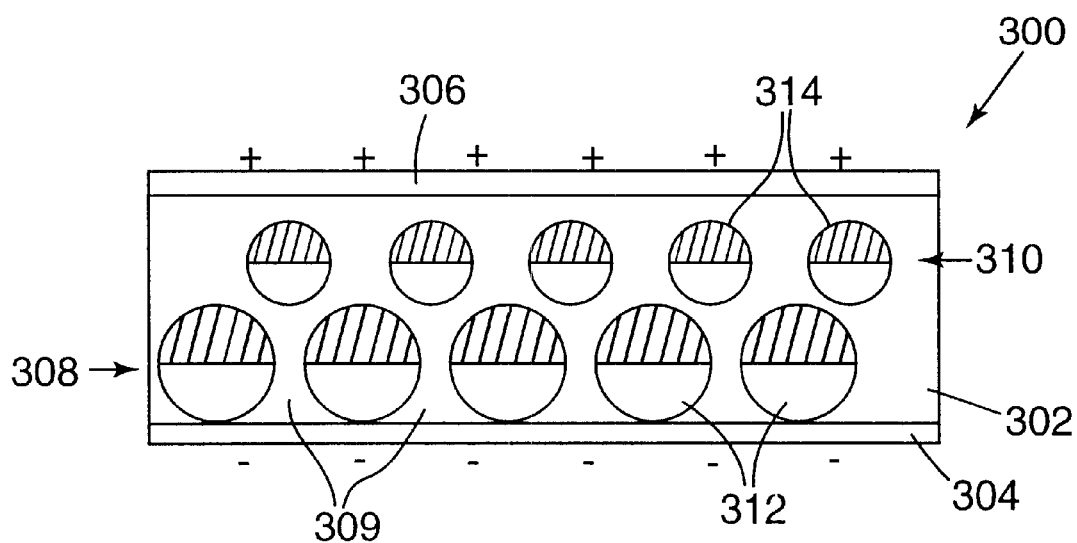
FIG. 3A illustrates a cross-section through a reflective particle display film having two monolayers of different-sized particles according to an embodiment of the present invention.
Figure 3B:
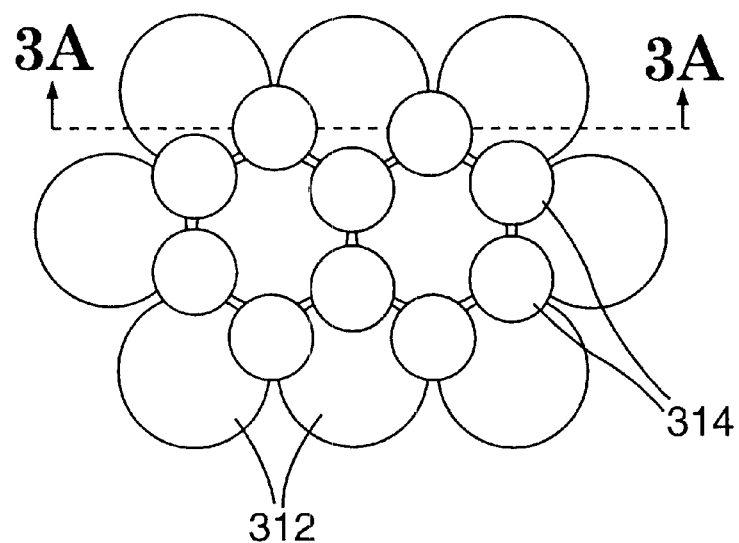
FIG. 3B illustrates a plan view of particles disposed within cross-section shown in FIG. 3A.

Another embodiment of a reflective particle display film is illustrated in FIG. 3A. The two-monolayer film 300 includes a matrix 302 and upper and lower electrode layers 304 and 306, respectively. The matrix 302 includes first and second layers 308 and 310 of bichromal particles, respectively. The particles 314 in the second monolayer 310 are smaller in size than the particles 312 in the first monolayer 308, and are positioned to "fill in" the interstitial gaps 309 in the first monolayer 308. A top view of the first monolayer 308 of larger particles 312 and the second monolayer 310 of smaller particles 314 is illustrated in FIG. 3B.

The vertical extent of the first monolayer 308, determined by the diameter of its particles 312, may overlap with the vertical extent of the second monolayer 310, determined by the diameter of its particles 314. Consequently, the particles 314 of the second monolayer may, at least partially, protrude into the interstitial space between adjacent particles 312 of the first monolayer 308. In will be appreciated that, where the diameter of the particles 314 of the second monolayer 310 is sufficiently small, the vertical extent of the second monolayer 310 may be contained entirely within the vertical extent of the first monolayer 308.

Figure 7:
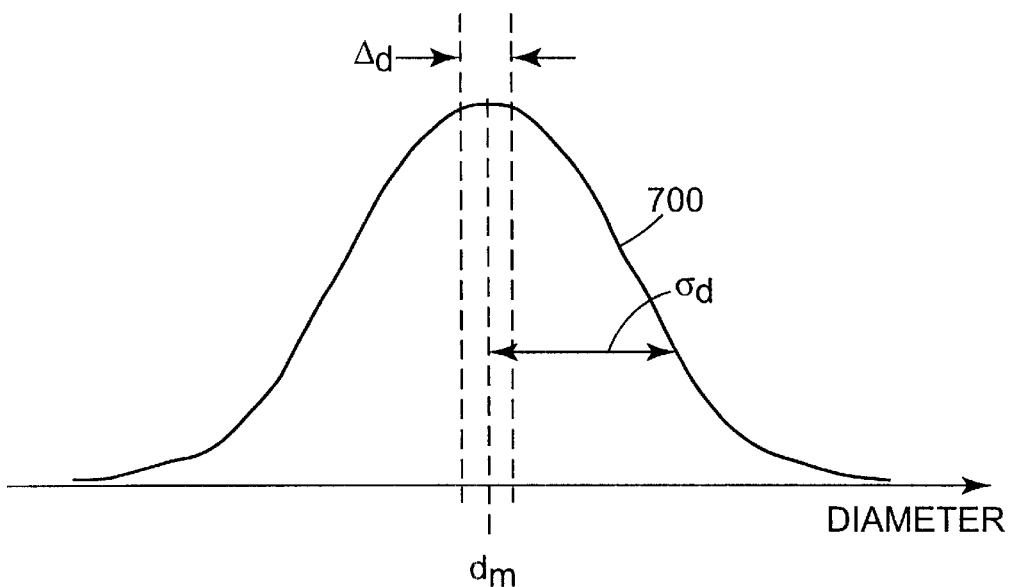
FIG. 7 illustrates a Gaussian distribution of particle diameters.

One advantage from using layers of different-sized particles is that the a larger portion of particles manufactured may be employed in the display. This advantage is better understood by considering FIGS. 7, and 8A–8C. The production methods for making bichromal particles, for example as discussed in U.S. Pat. No. 5,262,098, incorporated herein by reference, typically result in the generation of particles having a Gaussian distribution of diameters. Such a distribution is illustrated in FIG. 7A, which shows a Gaussian curve 700 of particle occurrence plotted against particle diameter. The mean diameter is given by $d_m$. The standard deviation of the Gaussian distribution is $\sigma_d$. If the display uses only mono-dispersed particles, i.e. particles whose diameters fall within a small range, say $\Delta d$, where $\Delta d$ is smaller than $\sigma_d$, then a large fraction of the manufactured particles remain unused. Therefore, another advantage to using two monolayers of particles in the display film is that a larger fraction of the particles produced can be used.

Figure 8C:
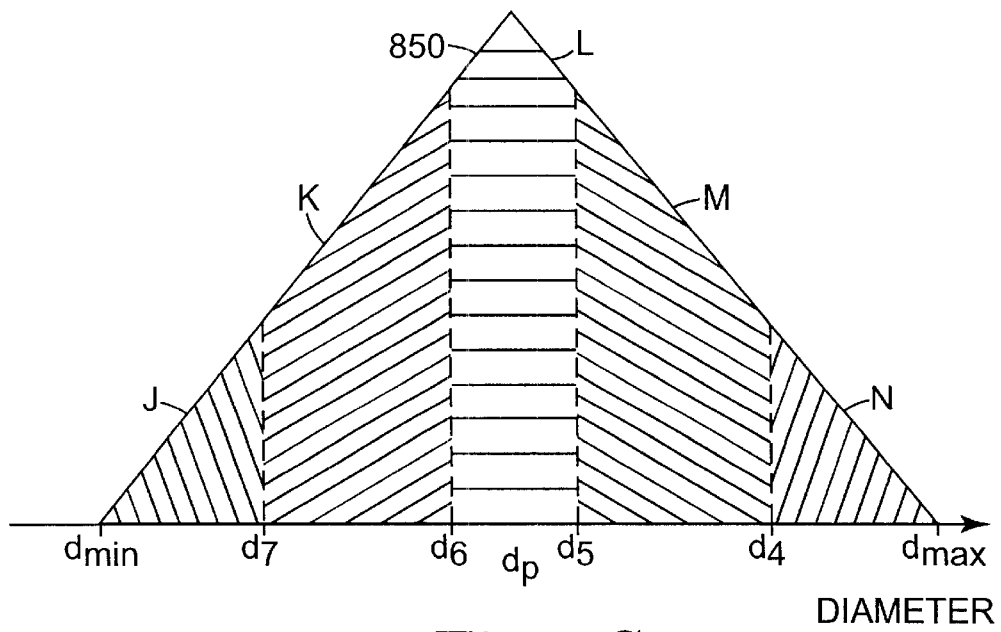
FIGS. 8B and 8C illustrate different distributions of particles being split into different groups.
Figure 8A:
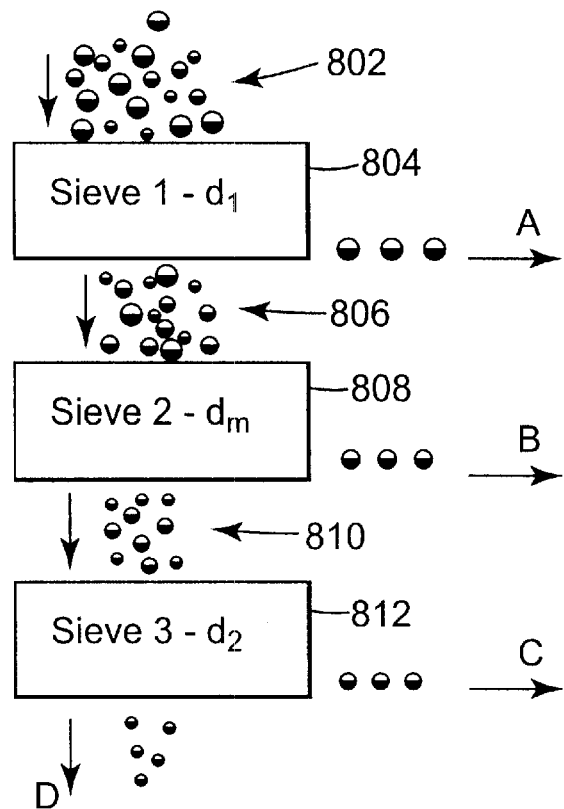
FIG. 8A illustrate illustrates a method of separating particles into groups according to diameter.

One method of selecting particles of different sizes is illustrated in FIG. 8A, which shows a number of sieves in sequence. Unsorted particles 802 are sieved through a first sieve 804, having a sieve aperture size of $d_1$. The particles 806 that have gone through the first sieve 804 are then passed into a second sieve 808, with a sieve aperture size of $d_m$. The particles 810 that have gone through the second sieve 808 are then passed into a third sieve 812 having a sieve aperture size of $d_2$. Therefore, groups of particles having sizes that fall into different ranges are separated from one another. The first sieve 804 produces a group of particles, group A, having a diameter of $d_1$ and above. The second sieve 808 produces a group of particles, group B, having a diameter in the range from $d_m$ to $d_1$. The third sieve produces a group of particles, Group C whose diameter lies in the range from $d_2$ to $d_m$, and a group of particles, Group D, whose diameter is less than $d_2$.

Figure 8B:
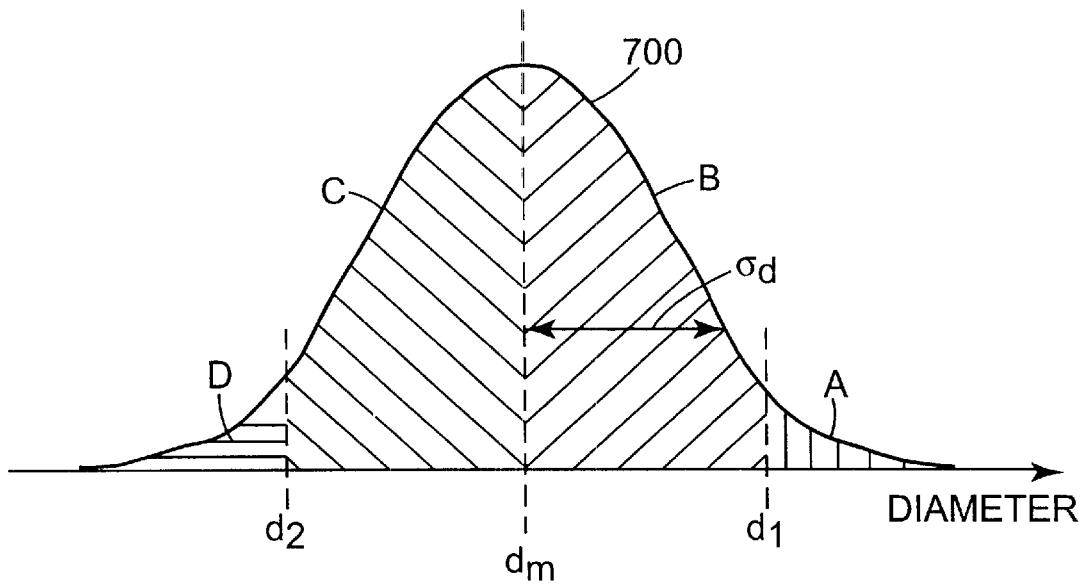

The distribution of particles into the different groups is illustrated in FIG. 8B. Different regions under the Gaussian curve 700 are shaded differently. In the example shown, the differences between $d_1$ and $d_m$, and between $d_m$ and $d_2$ are each greater than $\sigma_d$, and so Groups B and C each contain a large fraction of the total particle population. Accordingly, Groups A and D contain small fractions of the total particle population. The selection of the values of $d_1$ and $d_2$ relative to $d_m$ and $\sigma_d$, determines the fractions of the total particle population that end up in Groups B and C.

The particles falling within different diameter ranges may be used in a multiple layer display film. For example, particles in Group B may be used for one layer in a display film, while particles in Group C may be used for a second layer, thus permitting efficient use of the particles produced. Typically, the very smallest and very largest particles produced, in Groups A and D, are not used in a display film, while those particles having a diameter in a middle range may be used. For example, where $d_1$ and $d_2$ are each selected to differ from $d_m$ by $\sigma_d$, then groups B and C each include approximately 34% of the total population of particles, while groups A and D each include about 16%, i.e. about 32% of all particles made are not used in a display film. Where $d_1$ and $d_2$ are each selected to differ from $d_m$ by $1.44\sigma_d$, then groups B and C each include approximately 42.5% of the particles, while groups A and D each include about 7.5% of the particles. Also, when $d_1$ and $d_2$ are each selected to differ from $d_m$ by about $0.67\sigma_d$, then the fraction of particles in Groups A and D combined is about 50%. Furthermore, when $d_1$ and $d_2$ are each selected to differ from $d_m$ by about $0.32\sigma_d$, then the fraction of particles in Groups A and D combined is about 25%.

It should be appreciated that different sieve aperture sizes may be selected so as to select different fractions of the particle production distribution for each group. For example, the values of $d_1$ and $d_2$, need not be set symmetrically around $d_m$, but one value may be closer to $d_m$ than the other. Furthermore, the sieve aperture size of the second sieve 808 need not be set at $d_m$, but may be a different value between $d_1$ and $d_2$, say $d_3$.

The values of $d_1$, $d_2$ and $d_3$ may be selected to optimize the use of the particles in the distribution of particles produced. For example, $d_1$ and $d_2$ may be selected to exclude the largest and smallest particles produced, for example to exclude the largest 7.5% and smallest 7.5% of particles, that do not pack well with the remaining particles. Then, $d_3$ may be selected to give a particular ratio of numbers of particles in each group. For example, it may be desired to have equal numbers of particles in each group, or it may also be desired that there be more particles in one group than the other.

Different processes for manufacturing particles may produce particles having a production diameter distribution curve that is other than a normal-Gaussian curve, but which follows some other distribution function. Once the particular distribution function of particle diameters for a given manufacturing process is known, then a designer may select sieve aperture values to group particles according to selected diameter ranges. Judicious selection of sieve aperture values permits the designer to select what fraction of particles produced is used in each group.

Additionally, a different number of sieves may be used to separate the particles into groups of different diameter ranges. For example, a series of four sieves may be used to separate the particles into five groups of different diameter ranges. In illustration, consider FIG. 8C, which shows a triangular production distribution curve 850, having a peak value at $d_p$ and falling to zero at $d_{min}$ and $d_{max}$. The area under the distribution curve 850 is divided into five regions J–N, corresponding to the use of four sieves having sieve aperture values of $d_4$, $d_5$, $d_5$, and $d_7$ respectively. A two layer display film may be formed using particles in group K for one layer and particles in group M in another layer. If it is desired to form a film having three monolayers of particles, where each layer has particles of a different size, particles in group K may be used for one layer, particles in group L in another layer, and particles in group M in the final layer.

FIG. 4A illustrates a structure similar to that shown in FIG. 2A, but where the electrically activatable particles translate under the influence of the applied electric field, rather than rotate. Here, the film 400 includes a matrix 402 with upper and lower electrode layers 404 and 406, respectively. The matrix may be a clear polymer layer. The electrode layers 404 and 406 are preferably transparent. The matrix 402 includes two monolayers 408 and 410 of the microencapsulated electrophoretic particles 412, which operate in a manner illustrated in FIGS. 4B and 4C. The microencapsulated electrophoretic particle 412 includes an outer shell 414 which contains a liquid 416 and a ball 418. The liquid 416 may be, for example, a mixture of tetrachloroethylene and a dielectric plasticizer, such as ISOPAR, with a blue dye. The ball 418 may contain white microparticles of an atomized suspension of titanium dioxide in polyethylene. The average diameter of the balls 418 may be small, for example around 5 μm. The ball 418 need not be spherical. The ball 418 is electrically anisotropic, as illustrated by the "+" symbols on the ball 418.

When an electric field is applied between the electrode layers 404 and 406, the ball 418 moves in a direction determined by the electric field. For example, when a negative potential, −V, is applied to the upper electrode 404, the ball 418 is attracted towards the upper electrode 404, with the "+" side rotated towards the electrode 404. If the surface 420 is a viewing surface, then the viewer sees the ball 418 through only a thin layer of the liquid 416, if any at all.

When the applied voltage is reversed, so that a voltage of +V applied to the electrode 404, the "+" side of the ball 418 is repelled from the viewing surface 420. This is illustrated in FIG. 4C. The ball 418 is translated away from the electrode 404. Also, the titanium dioxide microparticles within the ball 418, that have the positive charge, migrate from one side of the ball 418 to the side of the ball farthest from the positive potential on the electrode 404. Consequently, the upper portion of the shell 414, closest to the electrode 404, is filled with the liquid 416. Where the liquid 416 has a color that contrasts with the color of the ball 414, then the movement of the ball 414, under reversal of the electric field across the film 400, results in a change of color seen by the viewer. Typically, the liquid 416 is dark, and the ball 418 is of a light color.

The microencapsulated electrophoretic particles 412 may be disposed within the matrix 402 in the same manner as the rotating particles discussed with regard to the other embodiments described herein, for example in one or more monolayers. Additionally, the microencapsulated electrophoretic particles 412 may be disposed in the matrix in two or more monolayers, where each monolayer includes particles of a size, or range of sizes, different from at least one other monolayer.

Since the microencapsulated electrophoretic particles 412 contain a liquid for the ball to move through, there is no need to inject the matrix containing the particles 412 with a liquid. Therefore, the use of microencapsulated electrophoretic particles permits the use of a non-permeable matrix, although a permeable matrix may still be used.

Figure 5A:
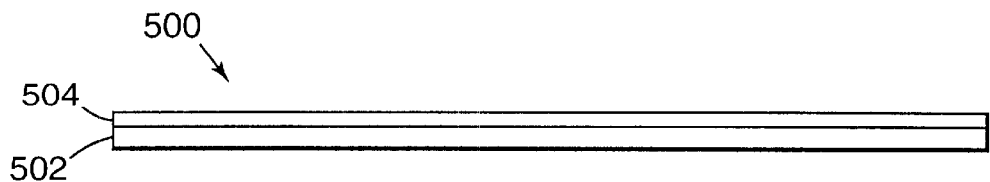
FIGS. 5A–5D illustrate fabrication steps of one method of fabricating a display film according to an embodiment of the present invention.

FIGS. 5A–5D illustrate one method of fabricating a two layer, reflective particle film 500. A first layer of polymer 504 having a uniform thickness is formed over a substrate layer 502, as illustrated in FIG. 5A, using a convenient coating technique, such as knife coating, curtain coating or roll to roll coating. The substrate layer 502 may be formed from a material such as, but not limited to, polyester, polyethylene, polypropylene coated paper, or polycarbonate. The first polymer layer 504 may be formed from urethane, silicone or epoxy.

Figure 5B:
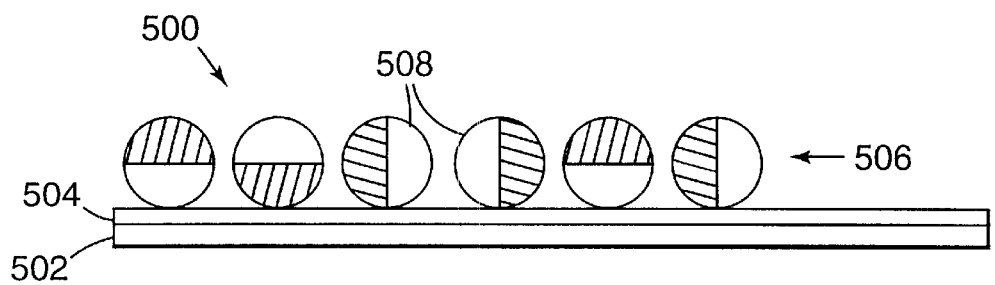

A first monolayer 506 of electrically activatable particles is formed on the first polymer layer 504, as illustrated in FIG. 5B. The electrically activatable particles may include either bichromal particles or electrophoretic particles. The monolayer 506 may include electrically activatable particles 508 packed closely together, for example in a hexagonal close-packed pattern, and the particles 508 may be arranged using any convenient transfer process, such as printing, transferring, screening, cascading, using a hot roll or using any combination thereof. The transfer process may embed the particles 508, even slightly, into the first polymer layer 504. The first polymer layer 504 may be partially cured prior to forming the first monolayer 506 of particles 508 thereover, in order to provide sufficient adhesion to maintain the particles 508 in place on the first polymer layer 504 during the subsequent fabrication process steps.

At this stage, the particles 508 are typically oriented in a rotationally random manner, and are not aligned until an electric field is applied across the film 500.

Figure 5C:
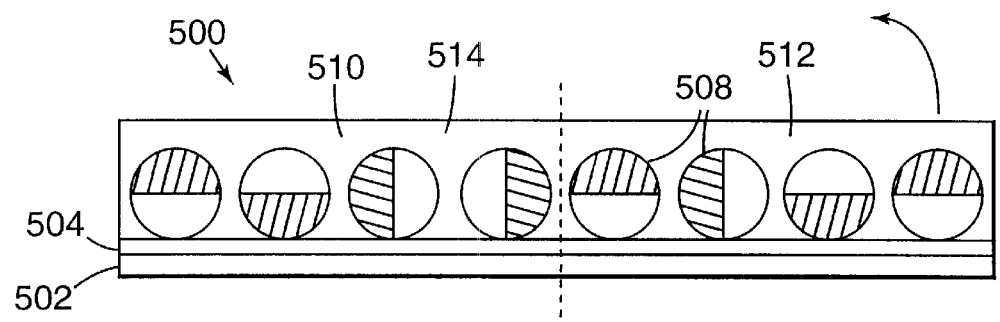
Figure 5D:
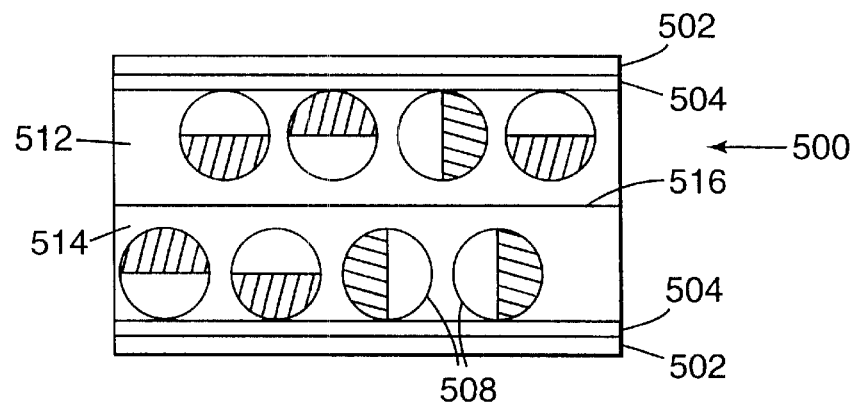

A second polymer layer 510 is then formed over the monolayer 506, as shown in FIG. 5C, using a convenient coating technique, for example a technique described in relation to forming the first polymer layer 504. The thickness of the second polymer layer 510 is typically larger than the diameter of the electrically activatable particles. The second polymer layer 510 may then be partially cured to ensure the integrity of the structure during the subsequent fabrication process steps.

The film 500 may then be separated into two portions, for example at the dotted line, and one portion 514 inverted and placed over the lower portion 516 so that the surfaces of the second polymer layers 510 of each portion 512 and 514 are in contact. Care is taken in contacting the upper and lower portions 512 and 514 to remove air bubbles from the interface 516 therebetween. The contacted, two-layer film 500 may then receive a final curing.

Where the polymer layer 504 absorbs a liquid to create liquid-filled cavities around the electrically activatable particles 508, the liquid may be absorbed following final curing of the film 500. Additionally, the fluid may be coated over the second polymer layer 510 of at least one of the portions 512 and 514 before contacting the two portions together.

Electrodes may be applied to the substrate layers 502 on either side of the resulting film 500, or the substrate layers 502 may be removed and electrode layers added. In addition, the substrate layer 502 may be provided with electrodes prior to the application of the first polymer layer 504. In this latter case, care is taken to register the electrodes of the upper and lower portions 512 and 514 when forming the contact at the interface 516.

Figure 6A:
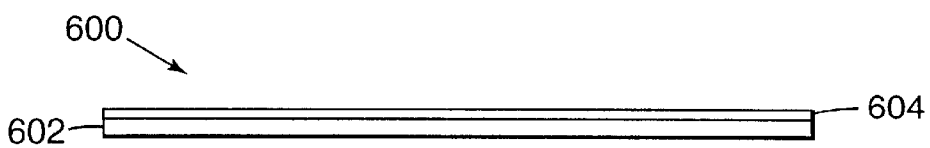
FIGS. 6A–6E illustrate fabrication steps of another method of fabricating a display film according to a second embodiment of the present invention.
Figure 6B:
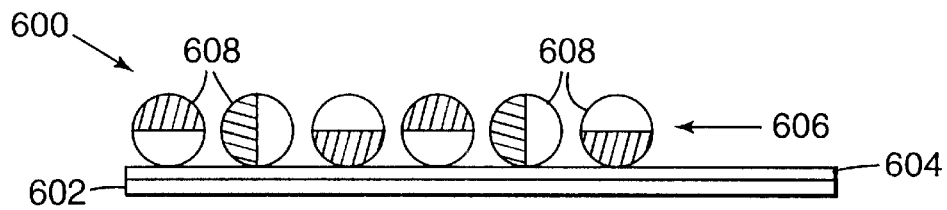

Another method of fabricating a two layer, reflective particle film 600 is illustrated in FIGS. 6A–6E. The first steps, forming a first layer of polymer 604 over a substrate layer 602, as illustrated in FIG. 6A, and then forming a first monolayer 606 of electrically activatable particles 608, as illustrated in FIG. 6B, are carried out in manners similar to those described in relation to FIGS. 5A and 5B above.

Figure 6C:
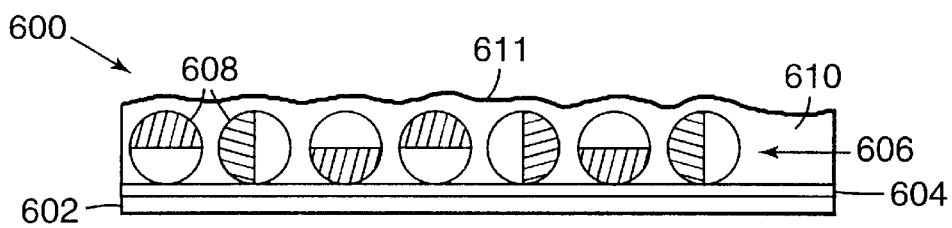

After the first monolayer 606 of particles 608 has been formed, a second polymer layer 610, having an upper surface 611, is formed over the first monolayer 606, as illustrated in FIG. 6C. The second polymer layer 610 may be formed by any convenient technique, including knife coating, curtain coating or roll to roll coating. The surface 611 of the second polymer layer 610 may be flat, may be contoured according to positions of the particles 606 positioned therebelow, or may have some other surface topology.

Figure 6D:
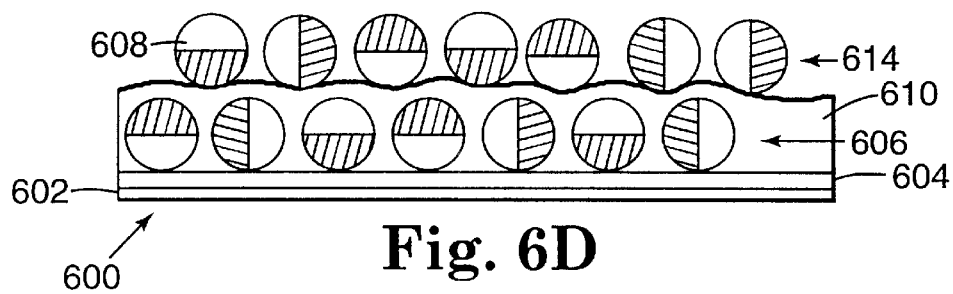

A second monolayer 614 of particles 608 is formed on the second polymer layer 610, as illustrated in FIG. 6D. Like the first monolayer, the second monolayer 614 may be formed by any convenient transfer process, such as printing, transferring, screening, cascading, or using a hot roll. The second polymer layer 610 may be partially cured to ensure that the particles 608 of the second monolayer maintain their positions during subsequent process steps.

Figure 6E:
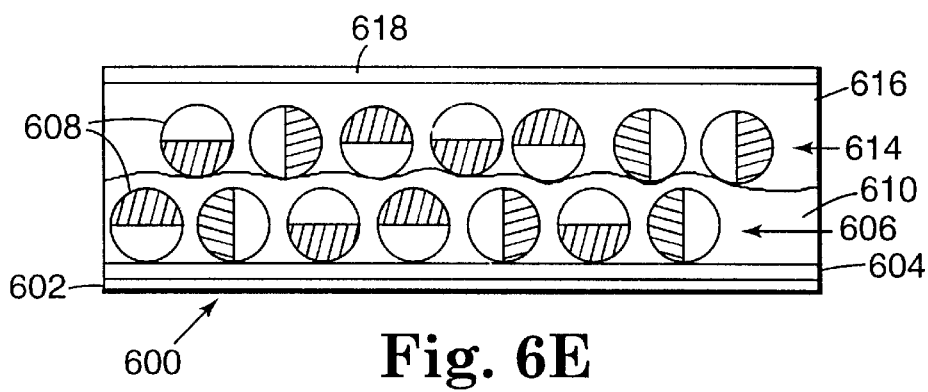

The second monolayer 614 is then covered by a third polymer layer 616. The third polymer layer 616 may be formed using any convenient technique, including the techniques used for applying the second polymer layer 610. The third polymer layer 616 may then be partially cured before application of a cover layer 618, which may be an electrode layer. This structure is illustrated in FIG. 6E.

The substrate layer 602 may be removed before subsequent application of an electrode layer, or may have electrodes applied directly, before or after the formation of the bi-layered film 600.

Variations of the methods illustrated in FIGS. 5A–5D and 6A–6E may be employed to fabricate films having more than two layers of electrically activatable particles.

Specific examples of film fabrication are presented.

EXAMPLE #1

Folded, Bi-monolayer Particle System 100 parts Dow Corning 184 Sylgard resin was mixed with 15 parts of Dow Corning 184 Sylgard curing agent and the silicone polymer mixture was degassed for ten minutes in vacuum prior to coating to prevent air entrapment. A 1.9 mil thick polyester film was coated with a two mil coating of the silicone polymer mixture and the structure was cured for eight minutes at 150° F. A close-packed monolayer of bichromal particles, ranging in diameter from 90–106 $\mu$m and supplied by Xerox Corporation, was coated onto the layer of partially-cured resin. Next, an overcoat of the same resin formulation, and having a thickness of 6 mils, was applied over the particles. The film was then cured for five minutes at 190° F. After removal from the oven, the sheet of film was cut in half and the two face sides with exposed silicone polymer were laminated together, taking special precautions to avoid air entrapment between the face sides. The entire construction was then cured for sixty minutes at 185° F.

EXAMPLE #2

Bi-monolayer Particle System

This system included the same steps as Example 1 up until the application of the second polymer layer. The second polymer layer is partially cured for five minutes at 190° F. After removal from the oven, a second close-packed monolayer of bichromal particles was coated onto the partially cured second polymer layer. Next, an overcoat of the same resin formulation, and having a thickness of 6 mils was applied over the second payer of particles and the resultant construction then cured for one hour at 185° F.

In other embodiments of the invention, films may be fabricated using the following processes.

Process A: Core Shell (Microencapsulated) Particles, Two Layer System

A 1.9 mil thick polyester film is coated with a two mil coating of a mixture of 100 parts Dow Corning 184 Sylgard resin and 15 parts of Dow Corning 184 Sylgard curing agent. This mixture is previously degassed for ten minutes in vacuum prior to coating to prevent air entrapment. The structure is cured for eight minutes at 150° F. A close-packed monolayer of core-shell, microencapsulated, bichromal particles, typically having diameters in the range 90–106 $\mu$m, is coated onto the layer of partially cured resin. This construction, including the polyester film, silicon resin and the bichromal particles is then overcoated with six mils of the same resin formulation as above. The construction is then cured for five minutes at 190° F. After removal from the oven, the sheet is cut in half and the two face sides with exposed silicone polymer laminated together, taking special precautions to avoid air entrapment. Then the entire construction is cured for sixty minutes at 185° F.

Process B: Microencapsulated Particles in Method to Make Finished Construction Ready for Use A 1.9 mil thick polyester film coated with a transparent conductor is overcoated with a two mil coating of a mixture of 100 parts Dow Corning 184 Sylgard resin and 15 parts of Dow Corning 184 Sylgard curing agent. This resin mixture is previously degassed for ten minutes in vacuum prior to coating to prevent air entrapment. The structure is then cured for eight minutes at 150° F. A close-packed mono-layer of microencapsulated bichromal particles, typically having diameters in the range 90–106 $\mu$m, is coated onto the layer of partially cured resin. This construction, including the polyester film, silicon resin and the particles is then overcoated with six mils of the same resin formulation as above. The construction is then cured for five minutes at 190° F. After removal from the oven, the sheet is cut in half and the two face sides with exposed silicone polymer are laminated together taking special precautions to avoid air entrapment. Then the entire construction is cured for sixty minutes at 185° F. It will be appreciated that the transparent conductor layer may be provided either between the polyester film and the resin, or on external surface of the polyester film.

Process C: Two Layer Particles with Oil/silicon Prepolymer Added As Tie Interlayer A 1.9 mil thick polyester film is coated with a one mil coating of a mixture of 100 parts Dow Corning 184 Sylgard resin and 15 parts of Dow Corning 184 Sylgard curing agent. The resin mixture is degassed for ten minutes in vacuum prior to coating to prevent air entrapment. The structure is cured for five minutes at 150° F. A close-packed mono-layer of bichromal particles, typically having diameters in the range 90–106 $\mu$m, supplied by Xerox Corporation, is coated onto the layer of partially cured resin. This construction, including the polyester film, silicon resin and bichromal particles is then overcoated with five mils of the same resin formulation as above. The construction is then cured for five minutes at 190° F. After removal from the oven, the sheet is cut into two portions and a two mil coating consisting of the same resin combined in 3 parts to 1 part Dow Corning 1 centistoke 200 oil is applied onto the partially cured resin of one of the portions. The partially cured silicon coating of other portion is then laminated to the silicone polymer of the first portion, sandwiching the two mil coating of low viscosity oil therebetween. Precautions are taken to avoid air entrapment in the laminate. The entire construction is then cured for sixty minutes at 185° F.

Process D: 3 Layers of Particles

A 1.9 mil thick polyester film is coated with a one mil coating of a mixture of 100 parts Dow Corning 184 Sylgard resin and 15 parts of Dow Corning 184 Sylgard curing agent. The resin mixture is degassed for ten minutes in vacuum prior to coating to prevent air entrapment. The structure is cured for five minutes at 150° F. A close-packed, mono-layer of bichromal particles, typically having diameters in the range 90–106 $\mu$m, supplied by Xerox Corporation, is coated onto the layer of partially cured resin. This construction, including the polyester film, silicon resin and bichromal particles, is then overcoated with five mils of the same resin formulation as above. The construction is then cured for five minutes at 190° F. After removal from the oven, the sheet is cut in half and a second close-packed monolayer of bichromal particles is coated on top of the resin of one of the halves, and a 5 mil thick layer of the same resin coated over the second layer of bichromal particles. The partially cured silicon coating of the other half is then laminated to the exposed silicone polymer, taking special precautions to avoid air entrapment. Then the entire construction is cured for sixty minutes at 185° F.

Figure 9:
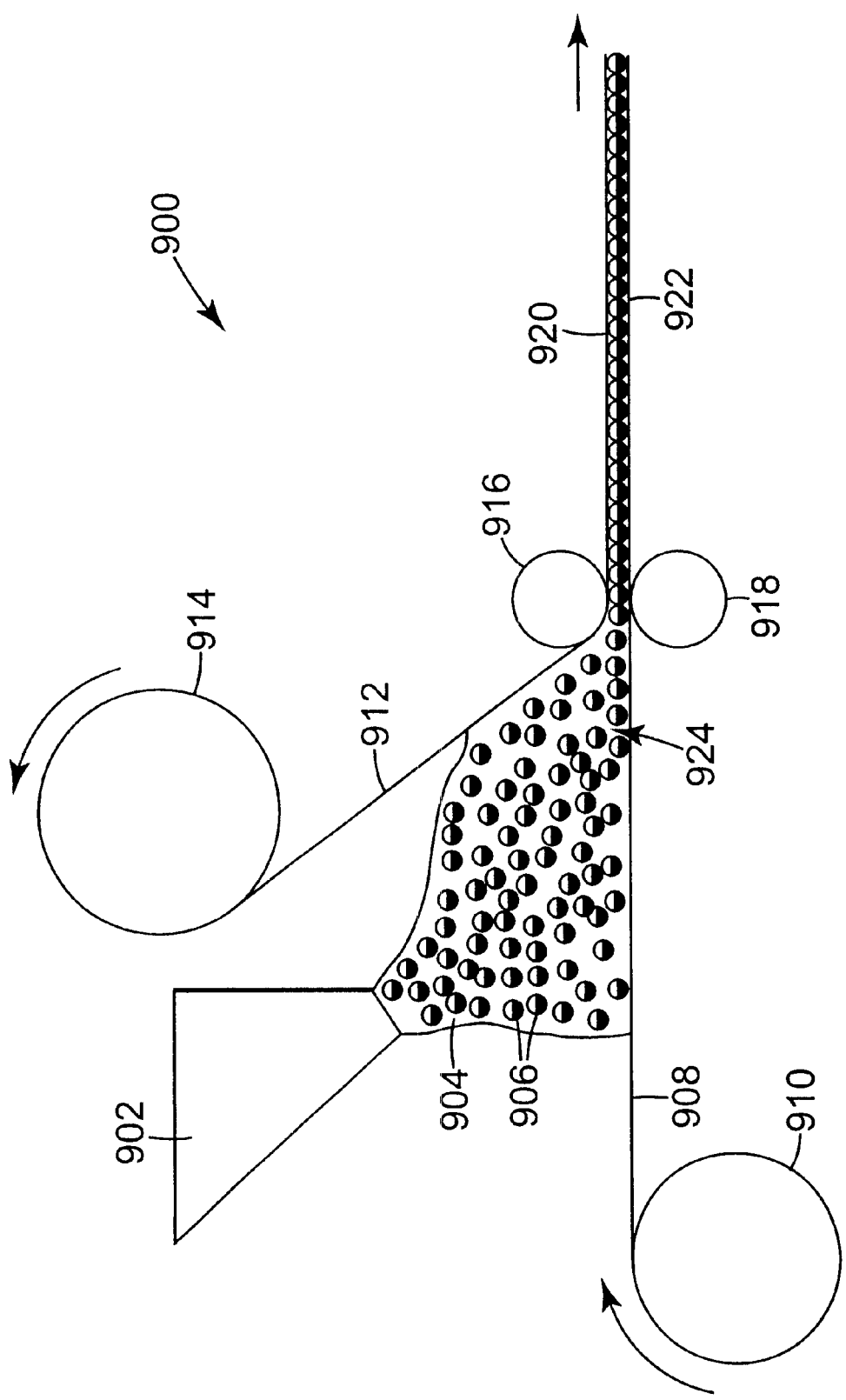
FIG. 9 illustrates a method of fabricating a display film according to an embodiment of the invention.

Another method of manufacturing a display film is illustrated in FIG. 9. The apparatus 900 used to form the film includes a die 902 that feeds a mixture 904 of resin and bichromal particles 906 onto a first liner sheet 908. The first liner sheet 908 is dispensed by a first roll 910. A second liner sheet 912, dispensed by a second roll 914, is fed onto the upper surface of the mixture 904. The two liner sheets 908 and 912, with the mixture 904 therebetween, are fed through a pair of pressurized nip rollers 916 and 918. The layered film 920, having the upper and lower liner sheets 912 and 908, with a layer of mixture 904 having a well defined height, is pulled from between the nip rollers 916 and 918. A "rolling bank" 924 of mixture 904 is formed behind the nip rollers 916 and 918, that feeds the mixture 904, containing the particles 906, between the liner sheets 908 and 912 as the liner sheets 908 and 912 pass between the rollers 916 and 918.

The upper liner sheet 912 may be formed from any transparent, flexible material. for example polyester, polycarbonate, acrylates and the like. The upper liner sheet 912 should be transparent since the viewer views the particles through the upper sheet. The lower liner sheet 908 may be made from the same material as the upper liner sheet, and may also be made from opaque, flexible materials, since the it is on the opposite surface of the film from the viewing surface.

The nip rollers 916 and 918 are pushed together with sufficient pressure to achieve the desired thickness of mixture layer 922. The actual pressure required to achieve the desired thickness depends on several factors, such as nip roll diameter, the material from which the surface of the nip roll is made, and the viscosity of the mixture between the liner sheets. Where a monolayer of particles 904 is desired in the layered film 920, as illustrated, the pressure on the nip rollers 916 and 918 is set so as to limit the height of the mixture layer 922 to be less than twice the diameter of a particle 904. Where two monolayers of particles 904 are desired, the pressure on the nip rollers 916 and 918 is reduced set so as to limit the height of the mixture layer 922 to be less than three times the particle diameter.

The packing of the particles 906 in the mixture layer is dependent on the ratio of particles 906 to resin in the mixture 904. The optimum for a monolayer of particles is approximately 55%–65% of particles by volume. A volume ratio of 60%:40% of particles to resin corresponds to approximately 1 g of particles to 0.75 g of Sylgard resin by weight. It is believed that the high concentration of particles 906 and the pressure exerted by the nip rollers 916 and 918 combine to force the particles 906 into a close-packed configuration. It is further understood that the same process is also useful for forming films that have more than one layer of particles, by adjusting the pressure on the nip rollers 916 and 918 to accommodate the combined height of the layers.

EXAMPLE #3

In an example of the method illustrated in FIG. 9, a mixture 904 was made up with 100 parts Sylgard 184, 15 parts Sylgard 184 curing agent, 115 parts Dow Corning 200-10 centistoke oil and 307 parts of bichromal particles 906. The bichromal particles 906 ranged in diameter from approximately 90 $\mu$m to 106 $\mu$m, and were provided by Xerox Corporation. The solution was degassed in a vacuum prior to spreading between two liner sheets using the apparatus shown in FIG. 9. The liner sheets were 4 mil thick polyester sheets. The nip rollers 916 and 918 were set for high pressure, to ensure that only a monolayer of particles 906 passed between the rollers 916 and 918.

Figure 10:
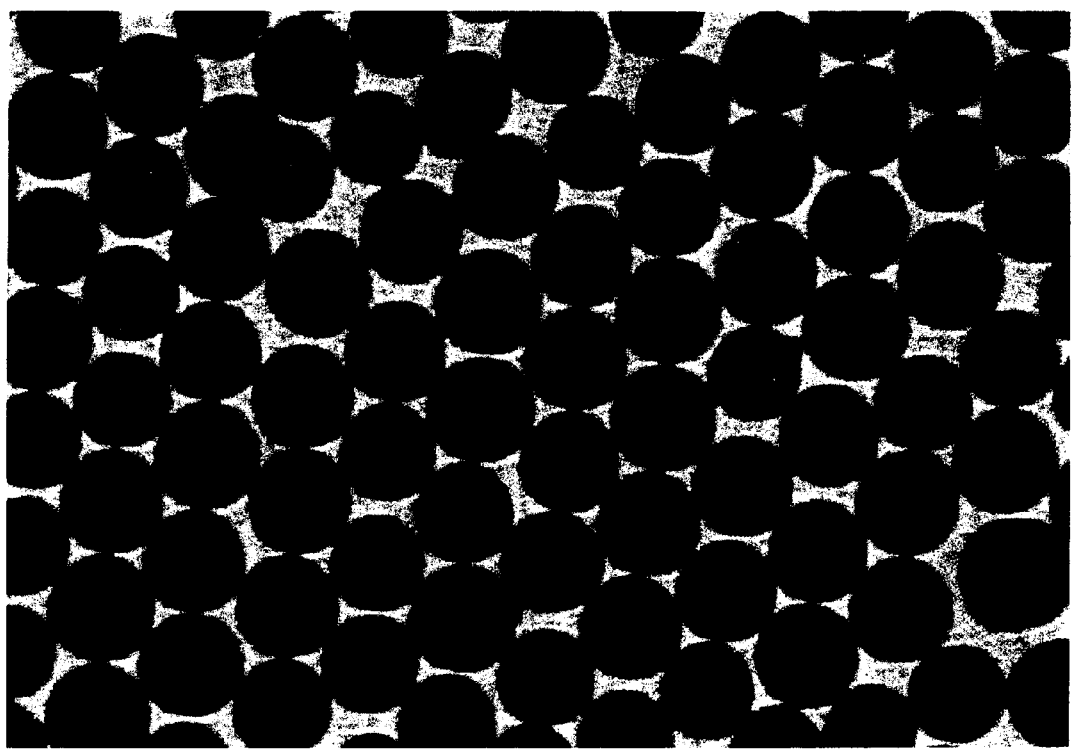
FIG. 10 shows a top view of a display film fabricated according to the method of FIG. 9.

A sheet of monolayer film fabricated using this method is illustrated in FIG. 10. It was experimentally shown that optimum packing occurred with a ratio of about 0.75 g resin to 1 g of particles, corresponding to a volume ratio of about 60% particles to 40% resin. Such a high particle loading results in a high viscosity mixture and increases the difficulties in de-gassing. The mixture may be heated to overcome these problems.

The particles 906 in the mixture 904 may be of different sizes. For example, the particles 906 be comprised of two populations of particles, where particles in the first population have diameters that lie within a first range of diameter values, while particles in the second population have diameters that lie within a second range of diameter values. Furthermore, we shall assume that the average diameter of particles in the first population is larger than the average diameter of particles in the second population. The larger particles, from the first population, control the separation between the nip rollers, if the pressure on the nip rollers is sufficiently high, and a monolayer of the larger particles is formed on passing between the nip rollers.

Figure 13:
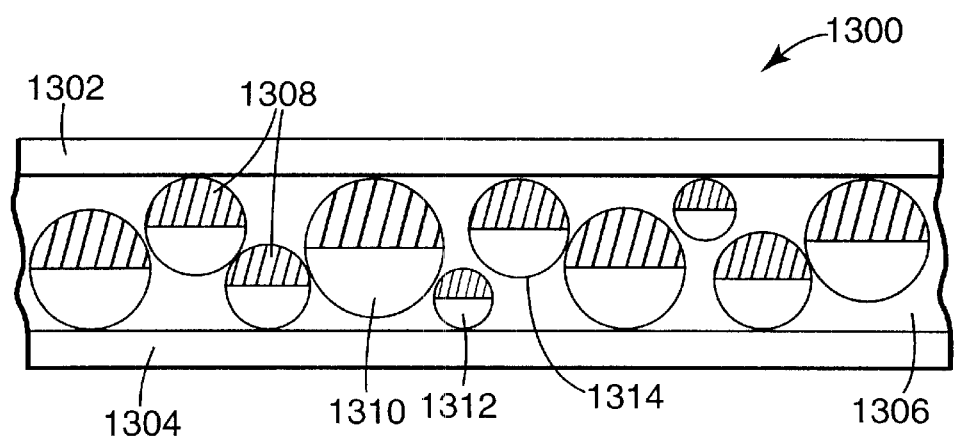
FIG. 13 illustrates another film according to the present invention.

A single layer film 1300, as might be made by the method illustrated in FIG. 9, is illustrated in FIG. 13. There are two liner sheets 1302 and 1304, with a mixture of resin 1306 and particles 1308 therebetween. The particles 1306 are selected from a production distribution of particles, prior to mixing with the resin 1306. The selected particles 1308 may constitute a significant fraction of the production distribution, for example up to 50%, or even up to 85% of the production distribution. The particles 1308 are pushed together as the mixture is squeezed between the nip rollers. The resin layer 1306 is slightly thicker than the diameter of the largest particle 1310. Particles of smaller diameter, however, may exhibit a degree of "stacking" within the resin layer 1306. In other words, the smaller particles may be aligned within the layer 1306 with their centers substantially removed from the center of the layer 1306, as illustrated for particles 1312 and 1314, so that a high volume packing fraction is achieved.

Figure 11:
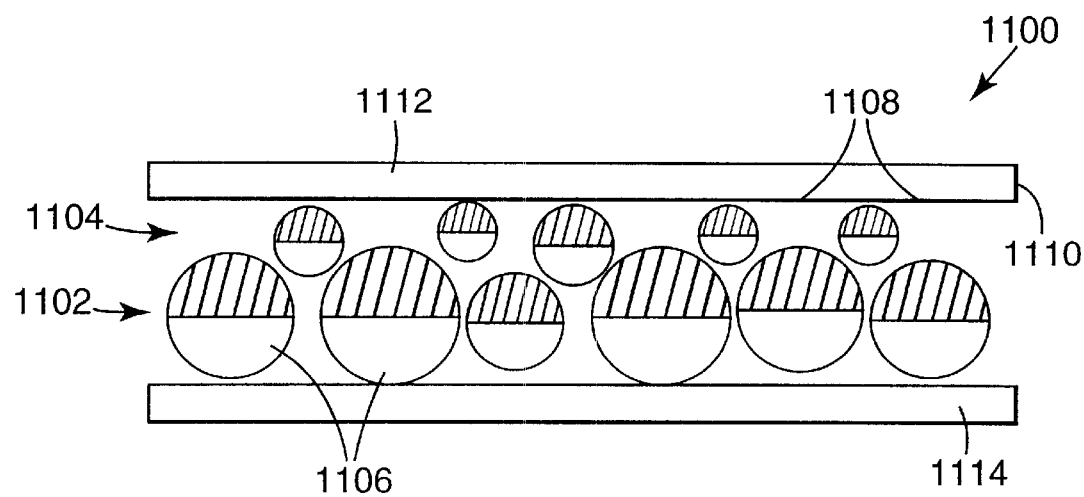
FIG. 11 illustrates a film having two monolayers of particles according an embodiment of the present invention.

Another display film 1100, shown in FIG. 11, has two monolayers of particles 1102 and 1104, where the size of particles 1106 in the lower layer 1102 is different from the size of particles 1108 in the upper layer 1104. The particles 1106 and 1108 are suspended within a polymer matrix layer 1110. The upper and lower liner sheets 1112 and 1114 may be provided with electrodes for activating the particles 1106 and 1108.

Figure 12:
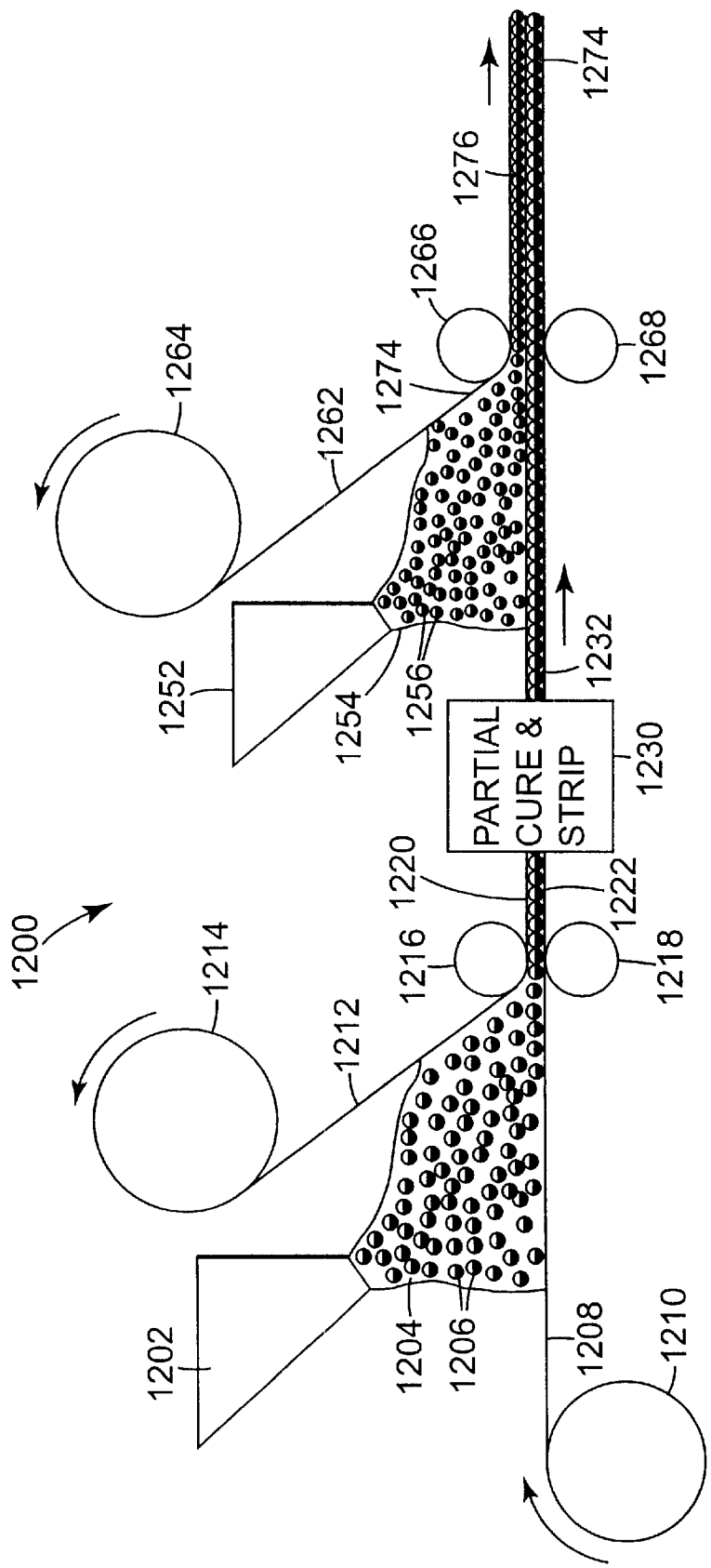
FIG. 12 illustrates another method of fabricating a display film according to an embodiment of the invention.

One particular method of making the film 1100 is illustrated in FIG. 12. The apparatus 1200 includes a first die 1202 that feeds a first mixture 1204 of resin and a population of first bichromal particles 1206 onto a first liner sheet 1208. The first bichromal particles 1206 have a first average diameter. The first liner sheet 1208 is dispensed by a first roll 1210. A second liner sheet 1212, dispensed by a second roll 1214, is fed onto the upper surface of the mixture 1204. The two liner sheets 1208 and 1212, with the mixture 1204 therebetween, are fed through a pair of pressurized nip rollers 1216 and 1218. The layered film 1220, having the upper and lower liner sheets 1212 and 1208, with a layer of mixture 1204 having a well defined height, is pulled from between the nip rollers 1216 and 1218. A "rolling bank" 1224 of mixture 1204 is formed behind the nip rollers 1216 and 1218, that feeds the mixture 1204, containing the particles 1206, between the liner sheets 1208 and 1212 as the liner sheets 1208 and 1212 pass between the rollers 1216 and 1218, to form a monolayer of particles 1222 in the layered film 1220. The upper liner 1212 is then stripped off the layered film 1220 in a stripper 1230. Prior to stripping off the top layer 1212, the layered film 1220 may be partially cured, for example by elevating to a selected temperature in an oven, in order to stabilize the film 1220. Stripping may be performed mechanically or chemically. For example, the upper liner sheet 1212 may be a silicone release paper film, or may be a polyester film, either of which may be mechanically peeled off a partially cured layered film 1220.

The film 1232, stripped of the upper liner sheet 1208, is used as a second liner sheet in a second layering process. A second die 1252 feeds a mixture 1254 of resin and second bichromal particles 1256 onto the stripped film 1232. The second bichromal particles may have an average size different from that of the average size of the first bichromal particles 1206. For example, the average size of the second bichromal particles 1256 may be smaller than that of the first bichromal particles 1206. Another liner sheet 1262, dispensed by a third roll 1264, is fed onto the upper surface of the mixture 1254. The stripped film 1232 and the liner sheet 1262, with the mixture 1254 therebetween, are fed through a second pair of pressurized nip rollers 1266 and 1268. A layered film 1270, having upper and lower liner sheets 1262 and 1208, with a layer 1272 of mixture having a well defined height, is pulled from between the nip rollers 1266 and 1268. A "rolling bank" 1274 of mixture 1254 is formed behind the nip rollers 1266 and 1268, that feeds the mixture 1254, containing the second particles 1256, between the stripped film 1232 and the liner sheet 1262. This results in a display film 1276 having a second monolayer of particles 1278 on top of the first monolayer 1222.

It will be appreciated that a film may be fabricated using the technique illustrated in FIG. 9, where the particles constitute a significant fraction of a production distribution, for example greater than 50%, and the resin layer has a thickness of up to approximately four times the diameter of the largest particle.

Figure 14A:
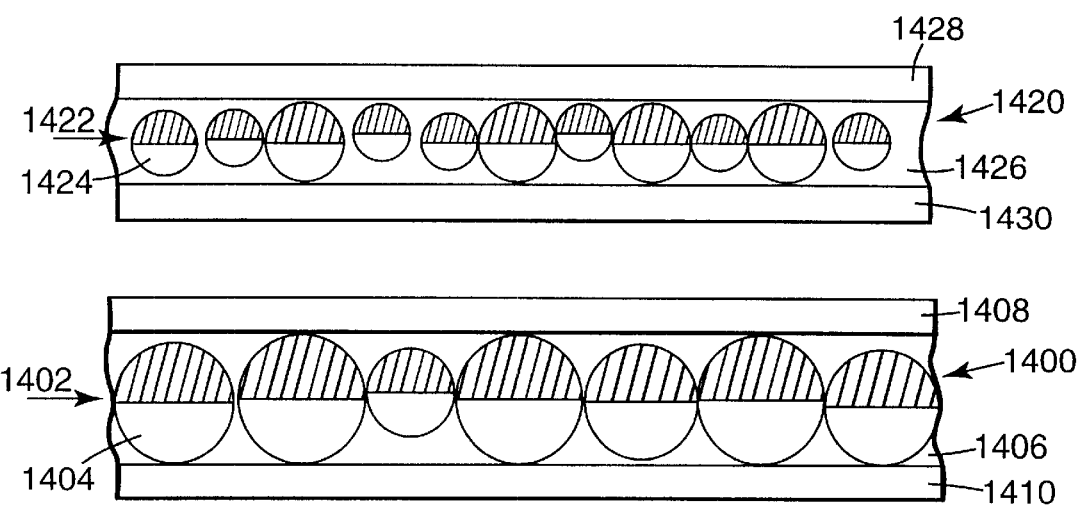
FIGS. 14A–14C illustrate fabrication steps of another method of fabricating a display film according to an embodiment of the present invention.
Figure 14B:
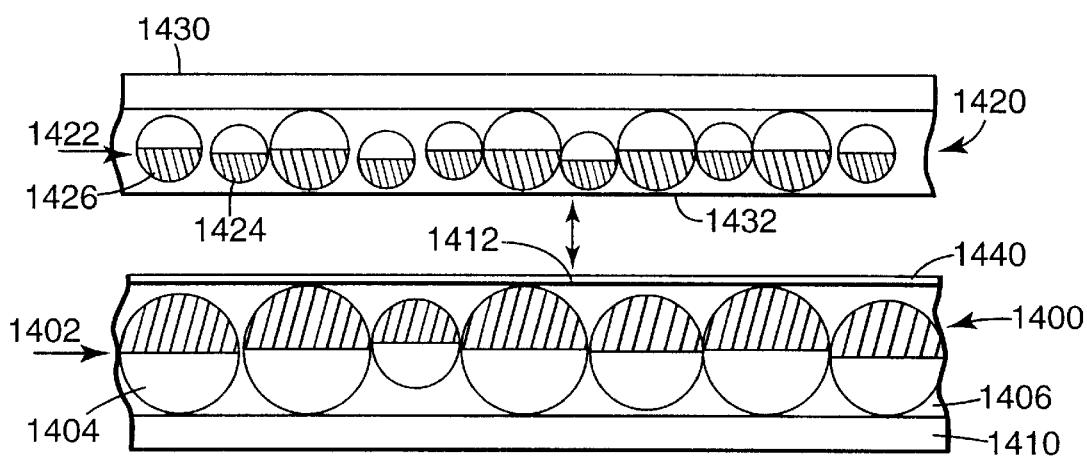
Figure 14C:
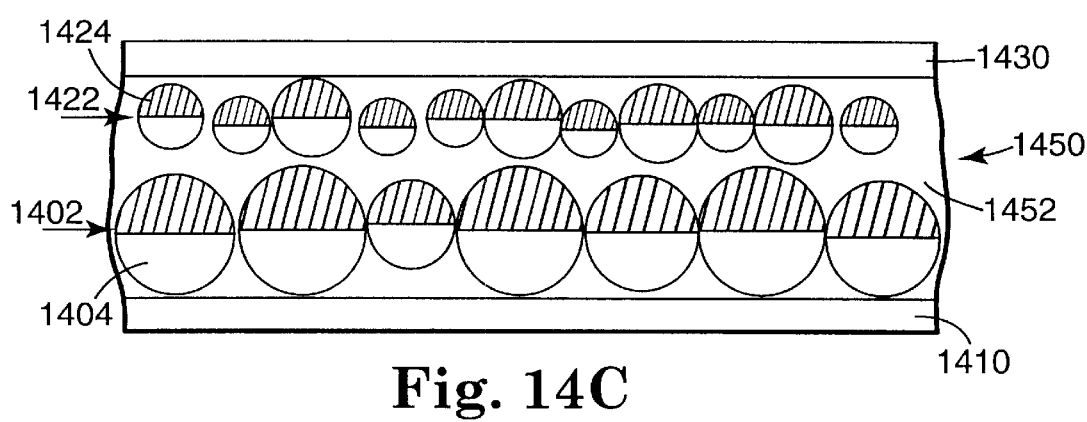

Another embodiment of a method for making a display film is illustrated in FIGS. 14A–14C. In FIG. 14A is illustrated two monolayer films 1400 and 1420. The first film 1400 is made, for example, using the process illustrated in FIG. 9, and has a monolayer 1402 of reflective particles 1404 within a polymer layer 1406. The film 1400 also has upper and lower liner sheets 1408 and 1410. The first film 1400 is made from a group of particles 1404 selected to have a first average diameter, for example from a first portion of a production distribution of particles.

The second film 1420 may also be made using a process like that illustrated in FIG. 9, and has a monolayer 1422 of reflective particles 1424 within a polymer layer 1426. The film 1420 also has upper and lower liner sheets 1428 and 1430. The second film 1420 is made from a group of particles 1424 selected to have a second average diameter, for example from a second portion of a production distribution of particles.

After partially curing each film 1400 and 1420, for example to a stage so that the polymer layers 1406 and 1426 no longer act as pressure sensitive adhesives, a liner sheet is stripped off each of the films 1400 and 1420. In the case shown in FIG. 14B, the upper liner sheets 1408 and 1428 are stripped off. Furthermore, the second film 1420 is inverted relative to the first film 1400, so that their respective stripped surfaces 1412 and 1432 face each other.

The two stripped films 1400 and 1420 are then laminated to each other, to produce the two layer film 1450, as illustrated in FIG. 14C, having the two monolayers 1402 and 1422 of particles. A binder layer, for example a thin layer of uncured polymer 1440 may be placed between the two stripped surfaces films 1412 and 1432 to promote adhesion between the stripped films 1400 and 1420. After curing, the resulting film 1450 has two monolayers 1402 and 1422 of particles in the polymer matrix 1452.

Depending on the relative sizes of the particles in the starting films, such a film may have particles of equal sizes in the monolayers, or different sizes. Furthermore, the upper liner layer 1430 of the two monolayer film 1450 may be stripped away to expose another polymer surface, and another monolayer film laminated thereto. Therefore, this method is useful for building up a film having a number of layers, one layer at a time.

The examples and processes described above discuss the use of bichromal particles having diameters within a specific range of values. This range is not included as a limitation on the invention, but is merely illustrative. The particles employed in the invention may have diameters lying outside this range. It will be appreciated that the resolution may increase and the operating voltage may decrease with the use of smaller particles and thinner films, for example with particles having an average diameter of 30 µm or less.

As noted above, the present invention is applicable to display media, including flat displays. It is believed to be useful as a form of electronic paper, where the display is very thin and flexible. It is also believed to be useful as an electronic display medium where the display is rigid. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of manufacturing a display film, comprising:

applying a monolayer of reflective particles over a first polymer coating, the reflective particles being movable responsive to the application of an electric field, covering the reflective particles with a second polymer coating having an upper surface; and applying the upper surface of a first portion of the second polymer coating to the upper surface of a second portion of the second polymer coating.

2. A method as recited in claim 1, further comprising at least partially curing the first polymer coating before applying the reflective particles over the first polymer coating.

3. A method as recited in claim 1, further comprising releasably applying the first polymer coating to a substrate layer and releasing the first polymer coating from the substrate layer after covering the reflective particles with the second polymer coating.

4. A method as recited in claim 1, further comprising applying the first polymer coating to a first electroded cover layer.

5. A method as recited in claim 1, further comprising applying a third polymer coating over the upper surface of at least one of the first and second portions before applying the upper surface of the first portion to the upper surface of the second portion, wherein the third polymer coating includes a liquid absorbable into the second polymer coating.

* * * * *

UNITED STATES PATENT AND TRADEMARK OFFICE
CERTIFICATE OF CORRECTION

PATENT NO. : 6,521,145 B1
DATED : February 18, 2003
INVENTOR(S) : Engler, David A.

It is certified that error appears in the above-identified patent and that said Letters Patent is hereby corrected as shown below:

Column 11,
Lines 4, 5 and 45, delete "Coming" and insert -- Corning --

Column 12,
Line 43, delete "the"

Column 13,
Line 9, delete "Coming" and insert -- Corning --

Signed and Sealed this

Twenty-sixth Day of April, 2005

JON W. DUDAS
*Director of the United States Patent and Trademark Office*